(12) United States Patent
Chou

(10) Patent No.: US 9,369,980 B2
(45) Date of Patent: Jun. 14, 2016

(54) METHOD OF HANDLING RANDOM ACCESS RESPONSE

(75) Inventor: Chie-Ming Chou, Taichung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 13/549,532

(22) Filed: Jul. 16, 2012

(65) Prior Publication Data
US 2013/0021993 A1 Jan. 24, 2013

Related U.S. Application Data

(60) Provisional application No. 61/509,118, filed on Jul. 19, 2011.

(51) Int. Cl.
| H04W 74/08 | (2009.01) |
| H04W 28/06 | (2009.01) |
| H04W 56/00 | (2009.01) |
| H04L 1/18 | (2006.01) |

(52) U.S. Cl.
CPC .......... *H04W 56/0045* (2013.01); *H04W 74/08* (2013.01); *H04L 1/1867* (2013.01); *H04W 28/06* (2013.01)

(58) Field of Classification Search
USPC ................. 370/241, 328, 329, 330, 331, 350; 455/418, 436, 450, 456.1
See application file for complete search history.

(56) References Cited

U.S. PATENT DOCUMENTS

| 2008/0194243 A1* | 8/2008 | Jeong et al. ................... 455/418 |
| 2008/0232283 A1* | 9/2008 | Jen ............................... 370/310 |
| 2009/0175253 A1* | 7/2009 | Wu et al. ....................... 370/338 |
| 2009/0190572 A1* | 7/2009 | Chang ........................... 370/350 |
| 2010/0034162 A1* | 2/2010 | Ou et al. ........................ 370/329 |
| 2010/0189071 A1* | 7/2010 | Kitazoe ......................... 370/331 |
| 2010/0195524 A1* | 8/2010 | Iwamura et al. .............. 370/252 |
| 2010/0232364 A1* | 9/2010 | Hsu .............................. 370/328 |

(Continued)

FOREIGN PATENT DOCUMENTS

| EP | 1 973 365 A2 | 9/2008 |
| EP | 1 973 365 A3 | 12/2008 |

(Continued)

OTHER PUBLICATIONS

ITRI, Considerations on Random Access on SCell, 3GPP TSG RAN WG2 #74, R2-113192, May 9-13, 2011, XP050495362, Barcelona, Spain.

(Continued)

*Primary Examiner* — Michael Thier
*Assistant Examiner* — Prince A Mensah
(74) *Attorney, Agent, or Firm* — Winston Hsu; Scott Margo

(57) ABSTRACT

A method of handling random access response for a network in a wireless communication system is disclosed. The method comprises receiving a first random access preamble from a first mobile device of the wireless communication system at a first component carrier of a plurality of component carriers, receiving a second random access preamble from a second mobile device of the wireless communication system at a second component carrier of the plurality of component carriers, wherein the second random access preamble is identical to the first random access preamble and is assigned by the network, and responding to the assigned second random access preamble with a random access response including a timing advance command associated to the second mobile device, at the first component carrier.

8 Claims, 16 Drawing Sheets

(56) References Cited

U.S. PATENT DOCUMENTS

| | | | |
|---|---|---|---|
| 2010/0272035 A1 | 10/2010 | Park | |
| 2010/0278128 A1* | 11/2010 | Lee et al. | 370/329 |
| 2010/0296467 A1* | 11/2010 | Pelletier et al. | 370/329 |
| 2011/0039541 A1* | 2/2011 | Park et al. | 455/422.1 |
| 2011/0045863 A1 | 2/2011 | Lee | |
| 2011/0159802 A1* | 6/2011 | Binti Harum et al. | 455/7 |
| 2011/0170535 A1* | 7/2011 | Wang et al. | 370/350 |
| 2011/0176513 A1* | 7/2011 | Yi et al. | 370/331 |
| 2011/0235609 A1* | 9/2011 | Ahn et al. | 370/329 |
| 2011/0249641 A1* | 10/2011 | Kwon et al. | 370/329 |
| 2012/0127930 A1* | 5/2012 | Nguyen et al. | 370/329 |
| 2012/0300715 A1* | 11/2012 | Pelletier et al. | 370/329 |

FOREIGN PATENT DOCUMENTS

| | | | |
|---|---|---|---|
| EP | 2 230 787 A1 | 9/2010 | |
| EP | 2 273 842 A2 | 1/2011 | |
| JP | 2009224885 A | 10/2009 | |
| WO | 0139416 A1 | 5/2001 | |
| WO | 2010064858 A2 | 6/2010 | |
| WO | 2010126418 A1 | 11/2010 | |
| WO | 2010145799 A1 | 12/2010 | |
| WO | WO 2010/145799 | * 12/2010 | H04W 72/12 |

OTHER PUBLICATIONS

LG Electronics Inc., Linking for Msg4, 3GPP TSG-RAN2 Meeting #70bis, R2-103930, Jun. 28-Jul. 2, 2010, pp. 1-3, XP050451296, Stockholm, Sweden.

Asustek, Issues of Random Access procedure on SCell, 3GPP TSG-RAN WG2 Meeting #74, R2-112922, May 9-13, 2011, XP050495298, Barcelona, Spain.

Nokia Corporation et al, Contention resolution on PCell vs. SCell, 3GPP TSG-RAN WG2 Meeting #70bis, R2-103514, Jun. 28-Jul. 2, 2010, XP050451099, Stockholm, Sweden.

Fujitsu, Msg4 and PDCCH reception, 3GPP TSG-RAN WG2 Meeting #70bis, R2-103848, Jun. 28-Jul. 2, 2010, pp. 1-2, XP050451254, Stockholm, Sweden.

CATT, Consideration on RACH in CA, 3GPP TSG RAN WG2 Meeting #69, R2-101058, Feb. 22-26, 2010, pp. 1-4, XP050421372, San Francisco, USA.

Renesas Mobile Europe, Multiple timing advance using multiple RACH, 3GPP TSG-RAN WG2 Meeting #74, R2-113014, May 9-13, 2011, XP050495152, Barcelona, Spain.

Samsung, "Issues on linking in RAL-10", 3GPP TSG-RAN2#69bis meeting, Tdoc R2-102447, Apr. 12-16, 2010, p. 1-5, Beijing, China.

MediaTek, "DL/UL linking and CC management", 3GPP TSG-RAN WG2 Meeting #69bis, R2-102107, Apr. 12-16, 2010, p. 1-6, Beijing, China.

Nokia Corporation, Nokia Siemens Networks, "Random Access Message Two", 3GPP TSG-RAN WG2 Meeting #61, R2-080948, Feb. 11-15, 2008, Sorrento, Italy.

CMCC, Discussion on the issues in LS from RAN2, 3GPP TSG RAN WG1 meeting #57-bis, R1-092821, Jun. 29-Jul. 3, XP050597549, Los Angeles, United States, Jun. 29, 2009.

3GPP, 3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10.2.0 (Jun. 2011), Jun. 21, 2011, pp. 1-54, XP050553468, 3GPP Organizational Partners, Valbonne, France.

CATT, CC linkage in CA, 3GPP TSG RAN WG2 Meeting #69bis, R2-102059, Apr. 12-16, 2009, Beijing, China.

Sharp, LG Electronics, NEC, RA-RNTI vs. C-RNTI for non-contention based random access, 3GPP TSG-RAN WG2#59bis, R2-073998, Oct. 8-12, 2007, pp. 1-2, Shanghai, China.

CATT, DL Assignment during non-contention based RACH for DL data arrival, 3GPP TSG-WG2 Meeting #66bis, R2-093763, Jun. 29-Jul. 3, 2009, pp. 1-2, Los Angeles, USA.

* cited by examiner

METHOD OF HANDLING RANDOM ACCESS RESPONSE

CROSS REFERENCE TO RELATED APPLICATIONS

This application claims the benefit of U.S. Provisional Application No. 61/509,118, filed on Jul. 19, 2011 and entitled "Method and apparatus to handle random access response for carrier aggregation" the contents of which are incorporated herein in their entirety.

BACKGROUND OF THE INVENTION

1. Field of the Invention

The application relates to a method utilized in a wireless communication system, and more particularly, to a method of handling random access response in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

According to structure of the LTE system, a UE performs a random access procedure to derive a timing advance command which allows the UE to be synchronized with a serving base station on uplink timing for preventing signals transmitted from the UE from colliding with those sent from other UEs under the coverage of the base station. In addition, the timing advance command is transmitted through a random access response message of the random access procedure. Note that, random access procedure includes non-contention random access procedure and contention random access procedure, which shall be well known in the art, so it is not given herein. In detail, the network uses a medium access control protocol data unit (MAC PDU) to transmit the timing advance command to the UE. A MAC PDU consists of a MAC header and one or more MAC Random Access Responses (MAC RAR) and optionally padding. A MAC PDU header consists of one or more MAC PDU subheaders, and each subheader corresponds to a MAC RAR. Moreover, a MAC PDU subheader consists of the three header fields E/T/RAPID, where "RAPID" represents random access preamble identifier for identifying the transmitted random access preamble. The UE decodes the corresponding MAC RAR based on the RAPID. A MAC RAR consists of four fields R/Timing Advance Command/UL Grant/Temporary C-RNTI, where "R" represents a reserved bit, "Timing Advance Command" indicates an index value used to control the amount of timing adjustment that a UE has to apply, "UL Grant" indicates the resources to be used on the uplink, and "Temporary C-RNTI" indicates the temporary identity that is used by the UE during the contention based random access procedure. In addition, the allocation of the MAC PDU is based on RA-RNTI which is calculated by the UE and network according to the timing and RB allocation of the transmitted random access preamble.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting. In carrier aggregation, the UE only has one RRC connection with the network. At RRC connection establishment/re-establishment/handover, one serving cell provides the NAS mobility information, and the security input. This cell is referred to as a primary cell (PCell). In the downlink, the component carrier corresponding to the PCell is the Downlink Primary Component Carrier (DL PCC) while in the uplink it is the Uplink Primary Component Carrier (UL PCC). In addition, cells other than the PCell are named secondary cell (SCell).

Besides, in LTE-Advanced system, a control signaling (i.e. PDCCH assignment) for a component carrier may be transmitted on different component carrier, hereafter called cross carrier scheduling. For example, a PDCCH order for a random access preamble assignment of a non-contention random access procedure is given in one component carrier, and the random access preamble of the non-contention random access procedure is transmitted in another component carrier.

The applicant notices problems associated to a random access response of a random access procedure in the cross carrier scheduling. Please refer to FIG. 1, which is a schematic diagram of a random access response collision. In FIG. 1, the network assigns random access preambles respectively for UE1 and UE2 through the component carrier cc#1. The UE1 transmits the random access preamble to the network via the component carrier cc#1, and the UE2 transmits the random access preamble to the network via the component carrier cc#2. In other words, the network assigns the random access preamble to the UE2 with the cross carrier scheduling. However, the network may assign identical random access preambles to UE1 and UE2 at the same time. In this situation, the network responses to the two random access preambles only with one random access response in the component carrier cc#1 since the received random access preambles correspond to the same RAPID, and thereby causing random access response collision. Nevertheless, the UE1 and UE2 does not know the random access response is for itself or not, and both apply the timing advance command in the random access response for uplink timing adjustment. This may cause interference in component carrier cc#1 or component carrier cc#2 since the timing advance command is accurate only for the UE1 or UE2.

In order to avoid collision of the random access response collision, the network may avoid assign identical random access preamble on each component carrier at the same time. However, this may restrict random access preamble configuration, and limit random access preamble assignment flexibility on all component carriers.

Moreover, the network may assign a random access preamble for UE2 with cross carrier scheduling on the component carrier cc#1. The UE2 transmits the assigned random access preamble to the network via the component carrier cc#2. On the other hand, the UE1 randomly selects a random access preamble, and transmits the random access preamble to the network via the component carrier cc#1. However, the randomly selected random access preamble may be identical to the assigned random access preamble. The network responses to the two random access preambles only with one random access response in the component carrier cc#1 since the received random access preambles correspond to the same RAPID, and thereby causing random access response collision. Similarly, the UE1 and UE2 does not know the random access response is for itself or not, and both apply the timing advance command in the random access response for uplink timing adjustment. This may cause interference in component carrier cc#1 or component carrier cc#2 since the timing advance command is accurate only for the UE1 or UE2.

Further, due to the above specification, a UE may encounter scenarios, causing resource waste, described as follows.

In the first scenario, please refer to FIG. 2, which illustrates a schematic diagram of a random access response collision in cross carrier scheduling according to a first embodiment of the prior art. The network assigns a preamble code for a SCell with a PDCCH order on a PCell (namely cross carrier scheduling), and thus the UE performs a non contention based random access procedure on the SCell for uplink timing synchronization. Meanwhile, another UE performs a contention based random access procedure on the PCell for uplink timing synchronization. The UE performing the contention based random access procedure may select a preamble code, which is identical to the assigned preamble code for the SCell. When the network receives both of the random access preambles from the PCell and SCell, the network responses the two random access preambles with only one random access response since the two random access preambles are identical and correspond to the same RAPID. Assume that the random access response including a timing advance command is for the UE performing the non contention based random access procedure on the SCell, but both of the UEs apply the timing advance command in the random access response. In this situation, the non contention based random access procedure is performed successfully, and no impact for an uplink transmission on the SCell. However, the contention based random access procedure may not be successfully performed since the timing advance command is for the non contention based random access procedure. For example, the message 3 of the contention based random access procedure may encounter interference (i.e. collision) due to the timing advance command in the random access response is not accurate for the UE performing contention based random access procedure, and thus the network responses a HARQ NACK to the UE on the PCell. The UE performing contention based random access procedure may continuously transmit the message 3 to the network until a number of the received HARQ NACK achieves to a certain number, and then sends a new random access preamble on the PCell. As can be seen, the uplink synchronization operation is delayed due to retransmissions of the message 3, and the resources are wasted for the contention resolution of the contention based random access procedure.

In the second scenario, please refer to FIG. 3, which illustrates a schematic diagram of a random access response collision in cross carrier scheduling according to a second embodiment of the prior art. Unlike the first scenario, only non contention based preamble on the SCell is received by the network. In other words, the contention based preamble on the PCell is sent but not received by the network. However, the UE performing the contention based random access procedure may consider that the contention based preamble is received by the network due to the random access response is received and decoded on the PCell, and thereby performs the contention resolution of the contention based random access procedure. Thus, interference and resource waste are occurred during the contention based random access procedure. The detailed description can be referred from above, so it is omitted herein.

In the third scenario, please refer to FIG. 4, which illustrates a schematic diagram of a random access response collision in cross carrier scheduling according to a third embodiment of the prior art. Unlike the first scenario, only contention based preamble on the PCell is received by the network. In other words, the non contention based preamble on the SCell is sent but not received by the network. According to the prior art, the network response to the contention based preamble with a random access response at the PCell. However, the UE performing the non contention based random access procedure may consider that the random access response RAR is for the non contention based preamble, and thereby causing confusion of the random access response. In addition, the UE determines that the non contention based random access procedure is successful and applies the timing advance command in the random access response. Thus, interference and resource waste are occurred during the non contention based random access procedure on SCell. The detailed description can be referred from above, so it is omitted herein.

SUMMARY OF THE INVENTION

The application discloses a method of handling random access response in a wireless communication system and a related communication device in order to solve the above-mentioned problems.

A method of handling random access response for a network in a wireless communication system is disclosed. The method comprises receiving a first random access preamble from a first mobile device of the wireless communication system at a first component carrier of a plurality of component carriers, receiving a second random access preamble from a second mobile device of the wireless communication system at a second component carrier of the plurality of component carriers, wherein the second random access preamble is identical to the first random access preamble and is assigned by the network, and responding to the assigned second random access preamble with a random access response including a timing advance command associated to the second mobile device, at the first component carrier.

A method of handling random access response for a network in a wireless communication system is disclosed. The method comprises assigning a first random access preamble for a first mobile device in a first component carrier of a plurality of component carriers, receiving a second random access preamble from a second mobile device at a second component carrier, wherein the second random access preamble is identical to the first random access preamble, receiving no assigned first random access preamble from the first mobile device at the first component carrier during a period of time, and responding no random access response to the first and second random access preambles.

A method of handling random access response for a mobile device in a wireless communication system is disclosed. The method comprises being assigned a random access preamble in one of the plurality of component carriers by a network of the wireless communication system, transmitting the random access preamble to the network, receiving a random access response, including a temporary-cell radio network temporary identifier (T-CRNTI) and corresponding to the random access preamble, from the network, and determining whether the random access response including a timing advance command is for the mobile device according to the T-CRNTI in the random access response.

A method of handling random access response for a mobile device in a wireless communication system is disclosed. The method comprises transmitting a random access preamble of a contention based random access procedure, to a network of the wireless communication system, receiving a random access response including an indicator from the network, and determining whether the received random access response is for the contention based random access procedure according to the indicator in the random access response.

A method of handling random access response for a mobile device in a wireless communication system is disclosed. The method comprises transmitting a random access preamble of a contention based random access procedure, to a network of the wireless communication system, receiving a random access response including an uplink grant from the network, and determining whether the received random access response is for the contention based random access procedure according to a size of the uplink grant.

A method of handling random access response for a mobile device in a wireless communication system is disclosed. The method comprises transmitting a random access preamble of a contention based random access procedure, to a network of the wireless communication system, receiving a random access response including a temporary cell radio network temporary identifier (T-CRNTI), from the network, and determining whether the received random access response is for the contention based random access procedure according to validity of the T-CRNTI.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
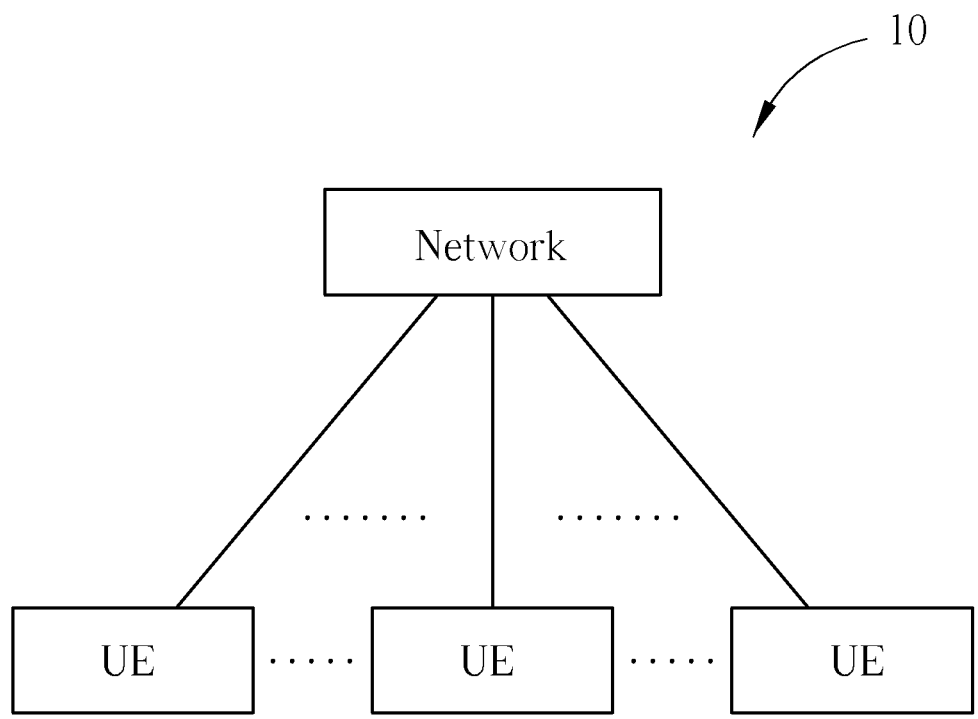
FIG. 5 illustrates a schematic diagram of an exemplary wireless communication system.

Please refer to FIG. 5, which is a schematic diagram of a wireless communication system 10. The wireless communication system 10 is a Long-Term Evolution advanced (LTE-A) system or other mobile communication systems, and is briefly composed of a network and a plurality of user equipments (UEs). In FIG. 5, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 1:
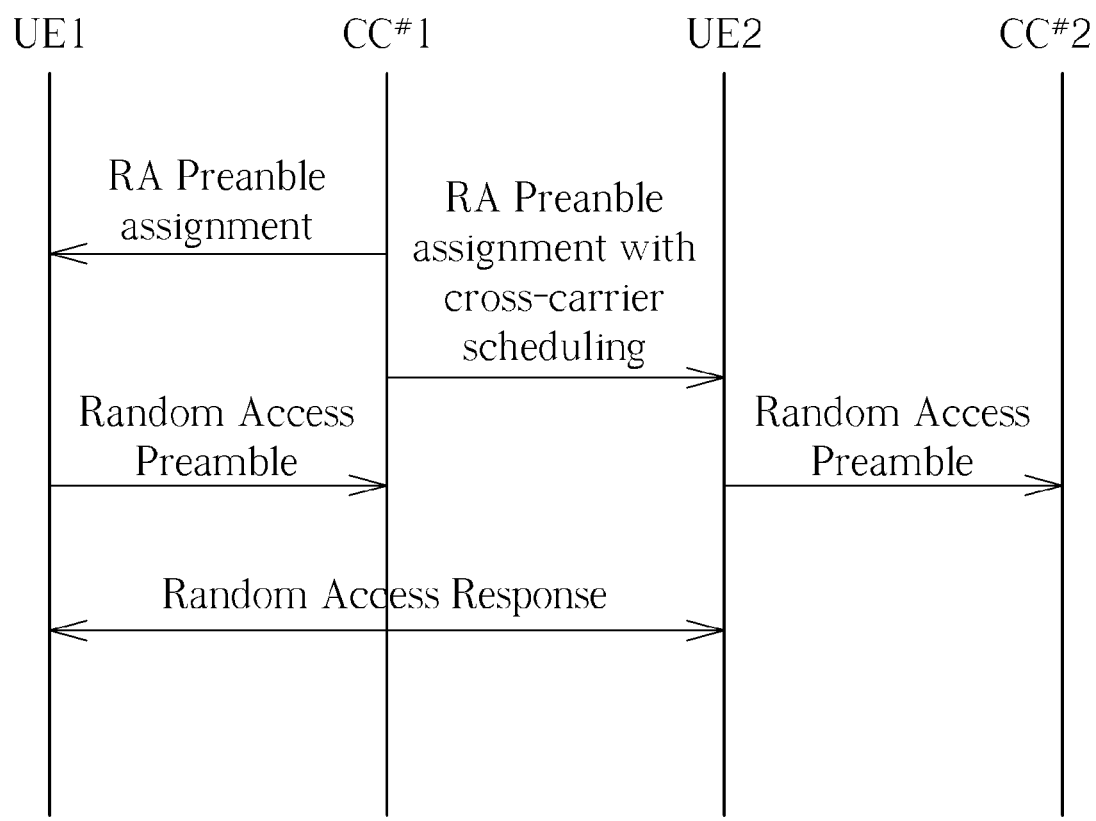
FIG. 1 illustrates a schematic diagram of a random access response collision according to the prior art.
Figure 2:
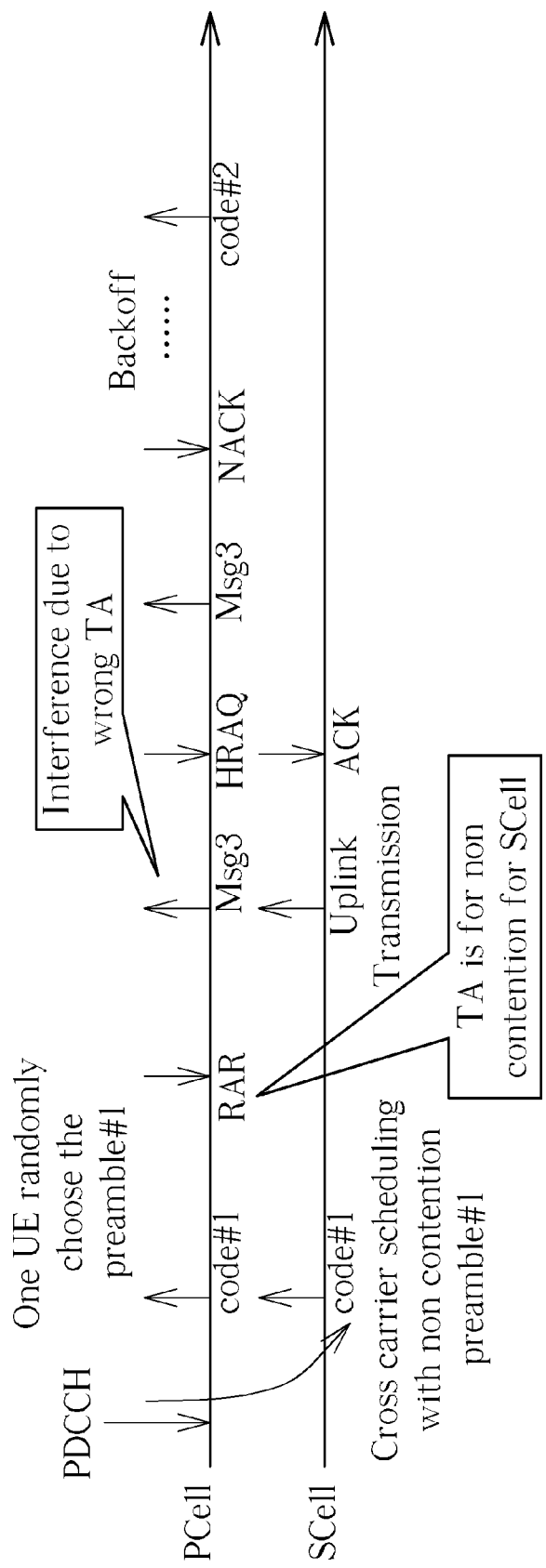
FIGS. 2-4 illustrate a schematic diagram of a random access response collision in a contention based random access procedure and a non contention based random access procedure according to the prior art.
Figure 3:
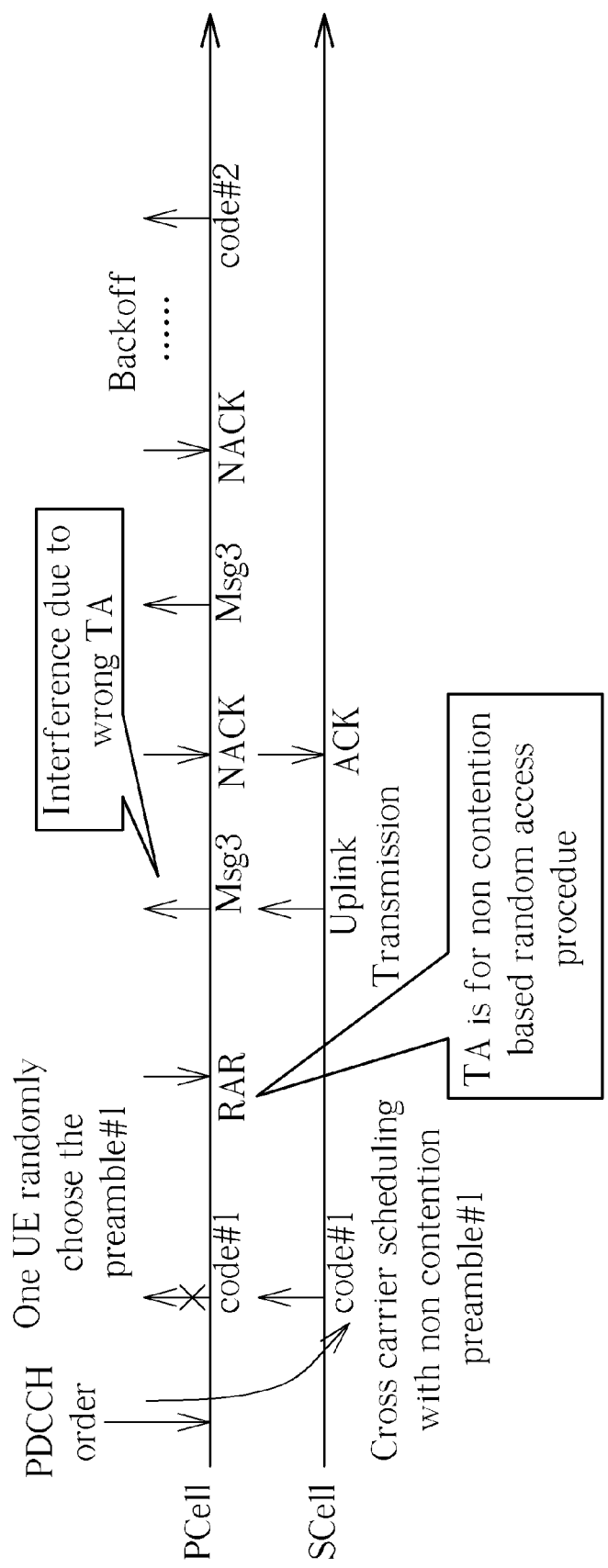
Figure 4:
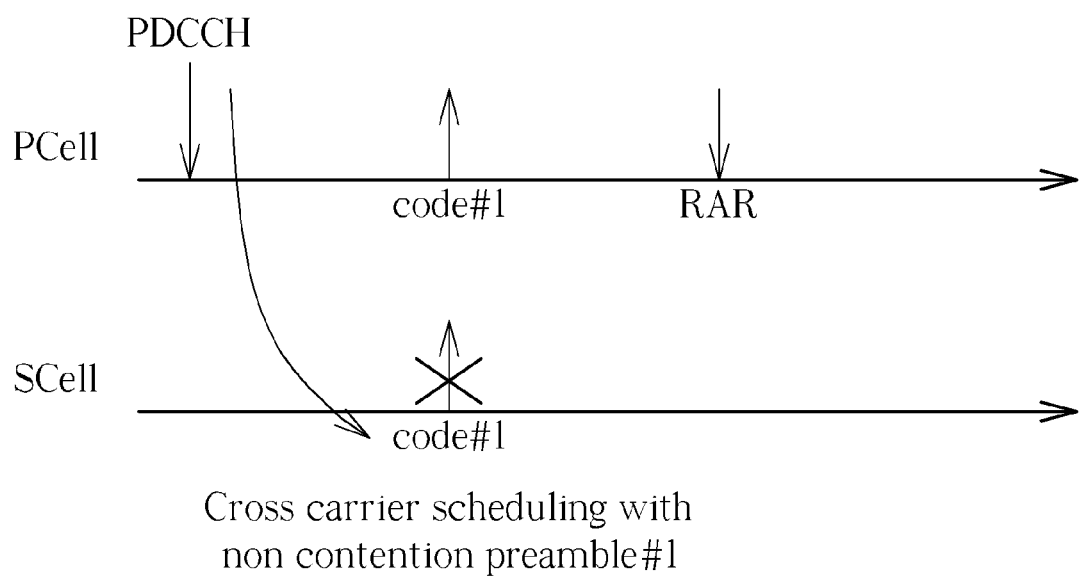
Figure 6:
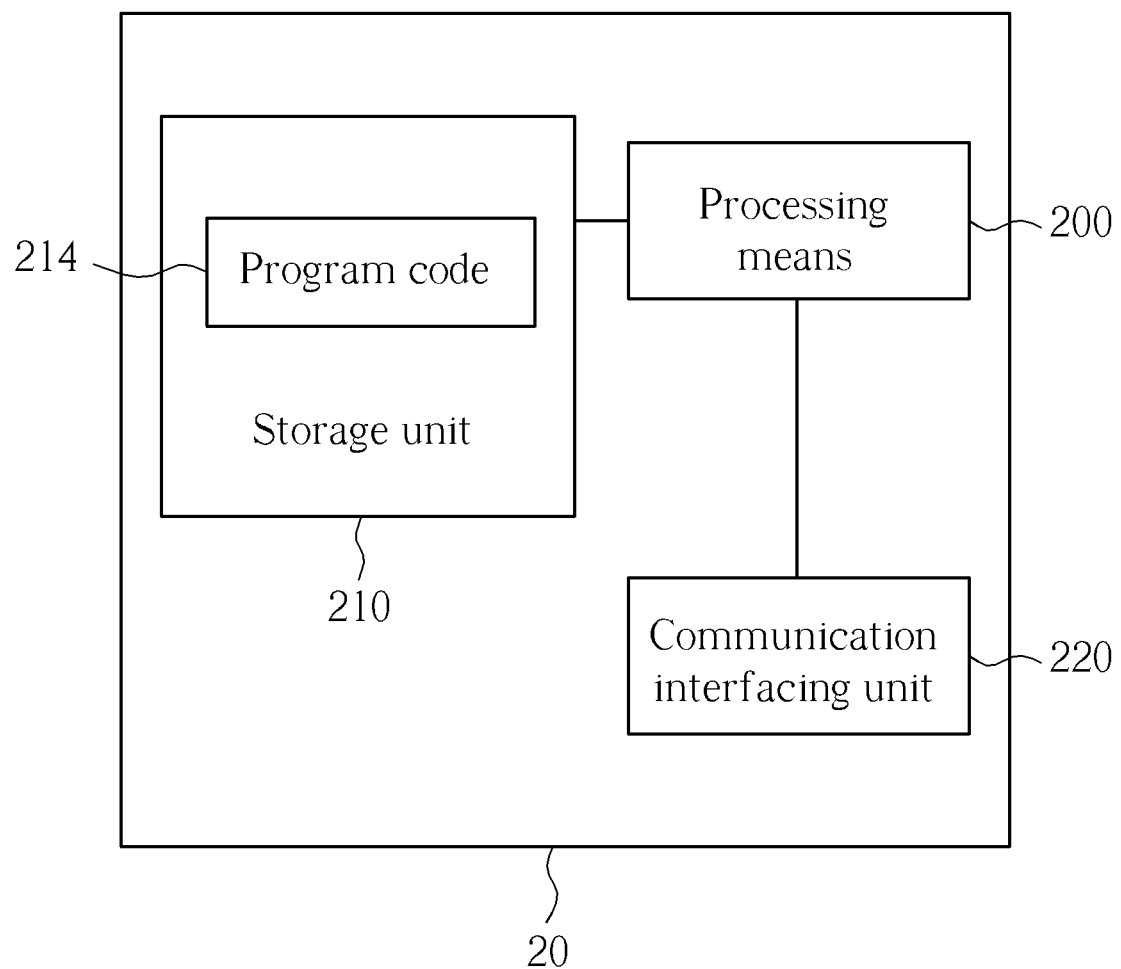
FIG. 6 illustrates a schematic diagram of an exemplary communication device.

FIG. 6 illustrates a schematic diagram of an exemplary communication device 20. The communication device 20 can be the mobile device 10 or base stations BS1-BSn shown in FIG. 4, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 7:
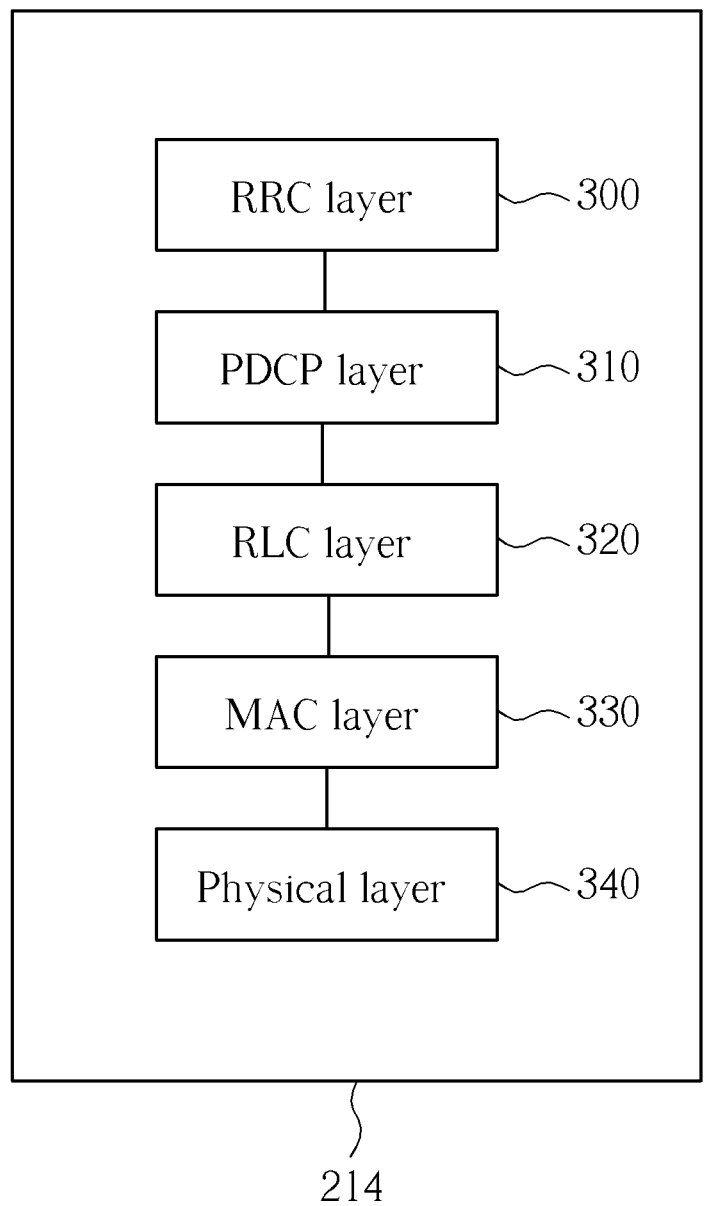
FIG. 7 illustrates a schematic diagram of communication protocol layers for an exemplary communication system.

Please refer to FIG. 7, which illustrates a schematic diagram of communication protocol layers for the LTE-Advanced system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. Main services and functions of the MAC layer 330 include error correction through HARQ, uplink synchronization through a random access procedure, etc.

In order to avoid interference and resource waste caused by the random access response collision in cross carrier scheduling, the present invention provides methods to solve the problems without modification of the MAC PDU format and/or random access preamble configuration.

Figure 8:
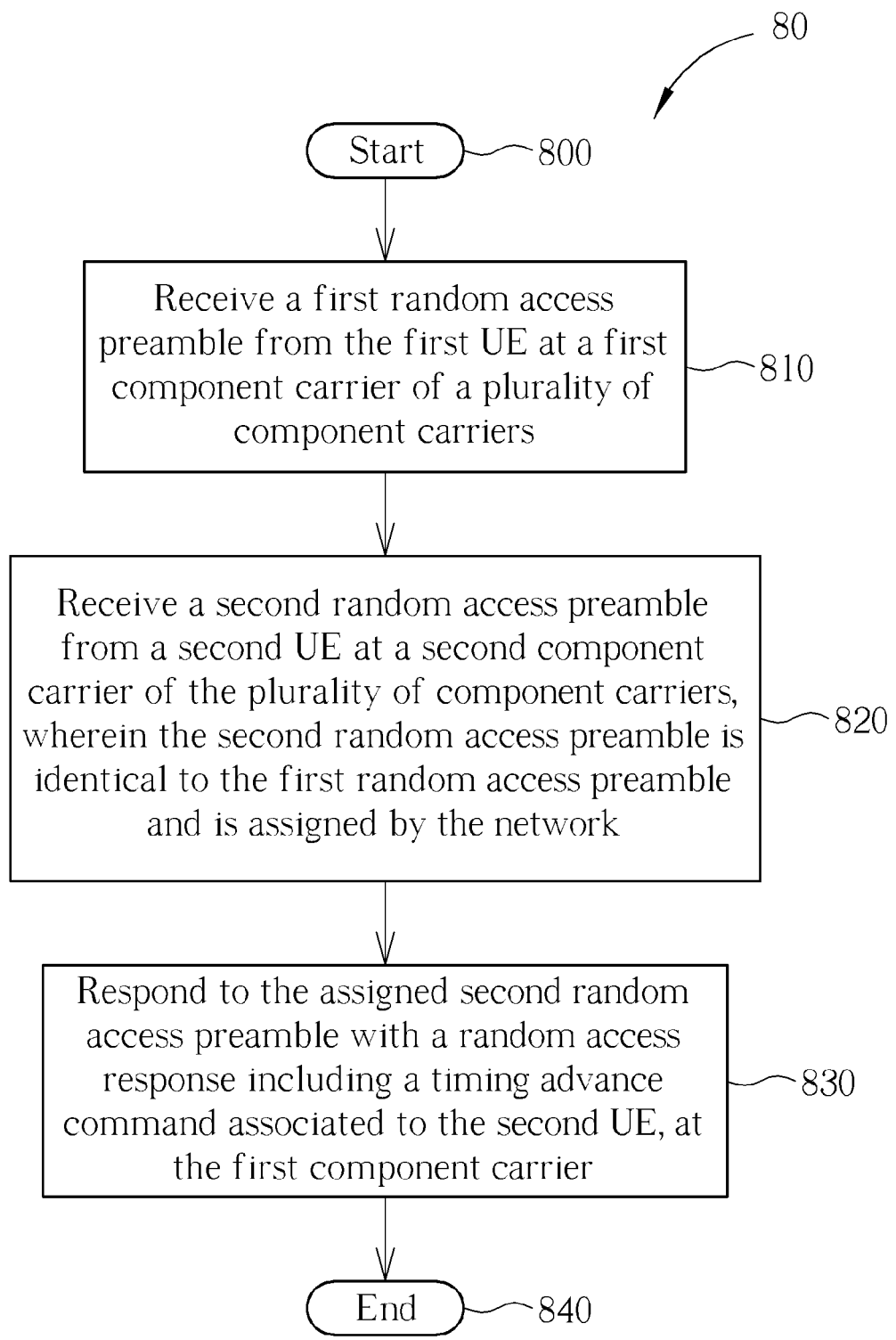
FIGS. 8-10 are flowcharts of exemplary processes.

Please refer to FIG. 8, which illustrates a flowchart of an exemplary process 80. The process 80 is utilized in a network, as the base station of FIG. 5, for handling random access response. The process 80 can be compiled into the program code 214 and includes the following steps:

Step 800: Start.

Step 810: Receive a first random access preamble from the first UE at a first component carrier of a plurality of component carriers.

Step 820: Receive a second random access preamble from a second UE at a second component carrier of the plurality of component carriers, wherein the second random access preamble is identical to the first random access preamble and is assigned by the network.

Step 830: Respond to the assigned second random access preamble with a random access response including a timing advance command associated to the second UE, at the first component carrier.

Step 840: End.

According to the process 80, the network identifies which received random access preamble is used for non contention based random access procedure (i.e. by checking the received random access preamble is assigned by itself or not), and sends the random access response to response the non contention based preamble at the first component carrier. In a word, the network determines that the non contention based random access procedure has higher priority than the contention based random access procedure, and thereby ignores a randomly selected random access preamble of the contention based random access procedure when the network receives the identical random access preambles at the same time.

Take an example based on the process 80. The network assigns a preamble code for a SCell with a PDCCH order on a PCell (namely cross carrier scheduling), and thus the UE performs a non contention based random access procedure on the SCell for uplink timing synchronization. Meanwhile, another UE performs a contention based random access procedure on the PCell for uplink timing synchronization. The UE performing the contention based random access procedure selects a preamble code, which is identical to the assigned preamble code for the SCell. When the network receives both of the random access preambles from the PCell and SCell, the network responses to the non contention based preamble with the random access response, and ignores the contention based preamble. Based on the concept of the process 80, the network knows how to handling the random access response if non contention based preamble and contention based preamble are identical and received at the same time.

Figure 9:
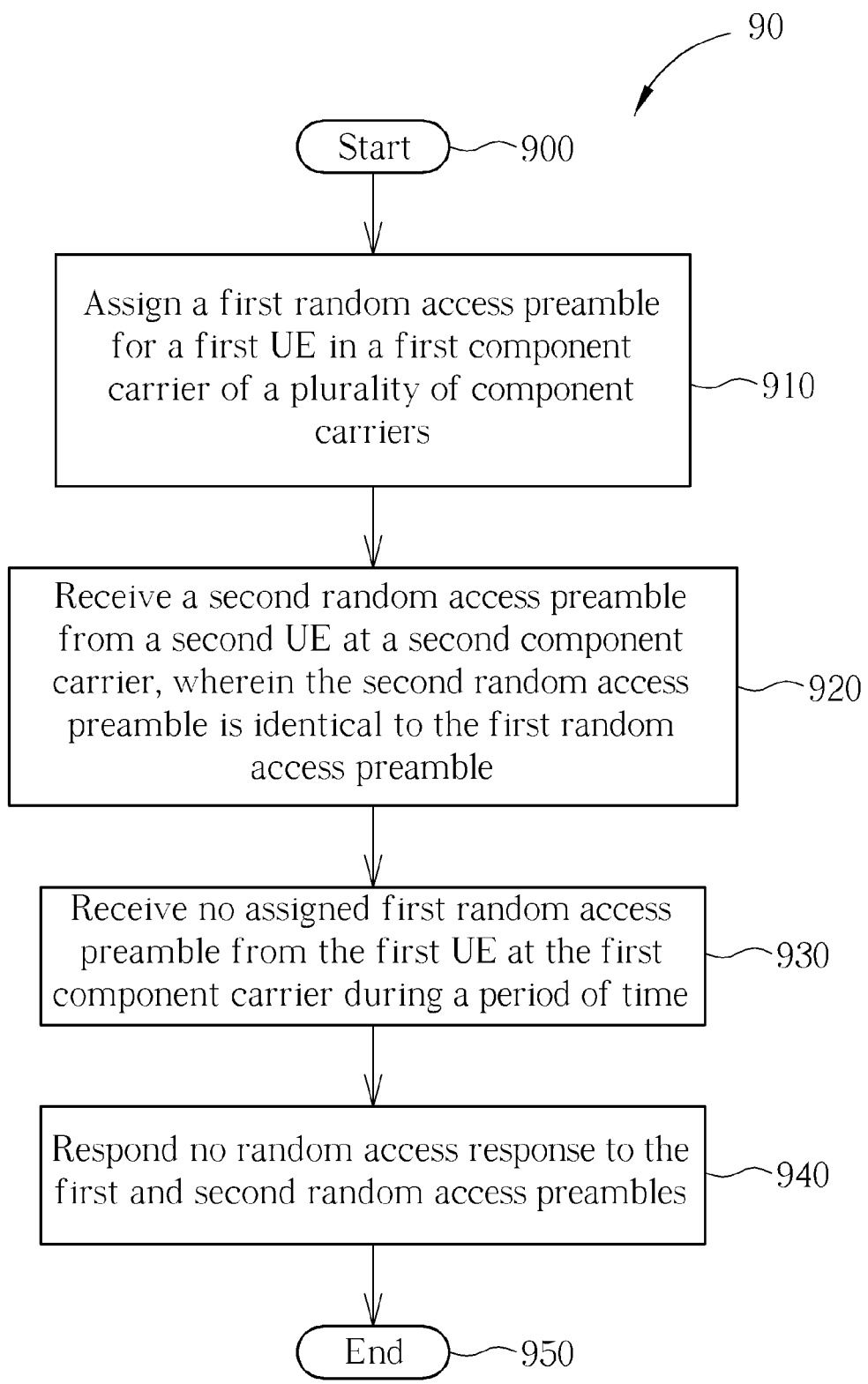

Please refer to FIG. 9, which illustrates a flowchart of an exemplary process 90. The process 90 is utilized in a network, as the base station of FIG. 5, for handling random access response. The process 90 can be compiled into the program code 214 and includes the following steps:

Step 900: Start.

Step 910: Assign a first random access preamble for a first UE in a first component carrier of a plurality of component carriers.

Step 920: Receive a second random access preamble from a second UE at a second component carrier, wherein the second random access preamble is identical to the first random access preamble.

Step 930: Receive no assigned first random access preamble from the first UE at the first component carrier during a period of time.

Step 940: Respond no random access response to the first and second random access preambles.

Step 950: End.

According to the process 90, the network does not response to the received contention based preamble if the non contention based preamble is not received, so as to avoid confusion of random access response as described in the prior art. Therefore, the UE performing non contention based random access procedure knows that the transmitted preamble is not received and will wait for another instruction to perform a new random access procedure. Similarly, the UE performing contention based random access procedure will re-try a random access procedure since no random access response is received.

Figure 10:
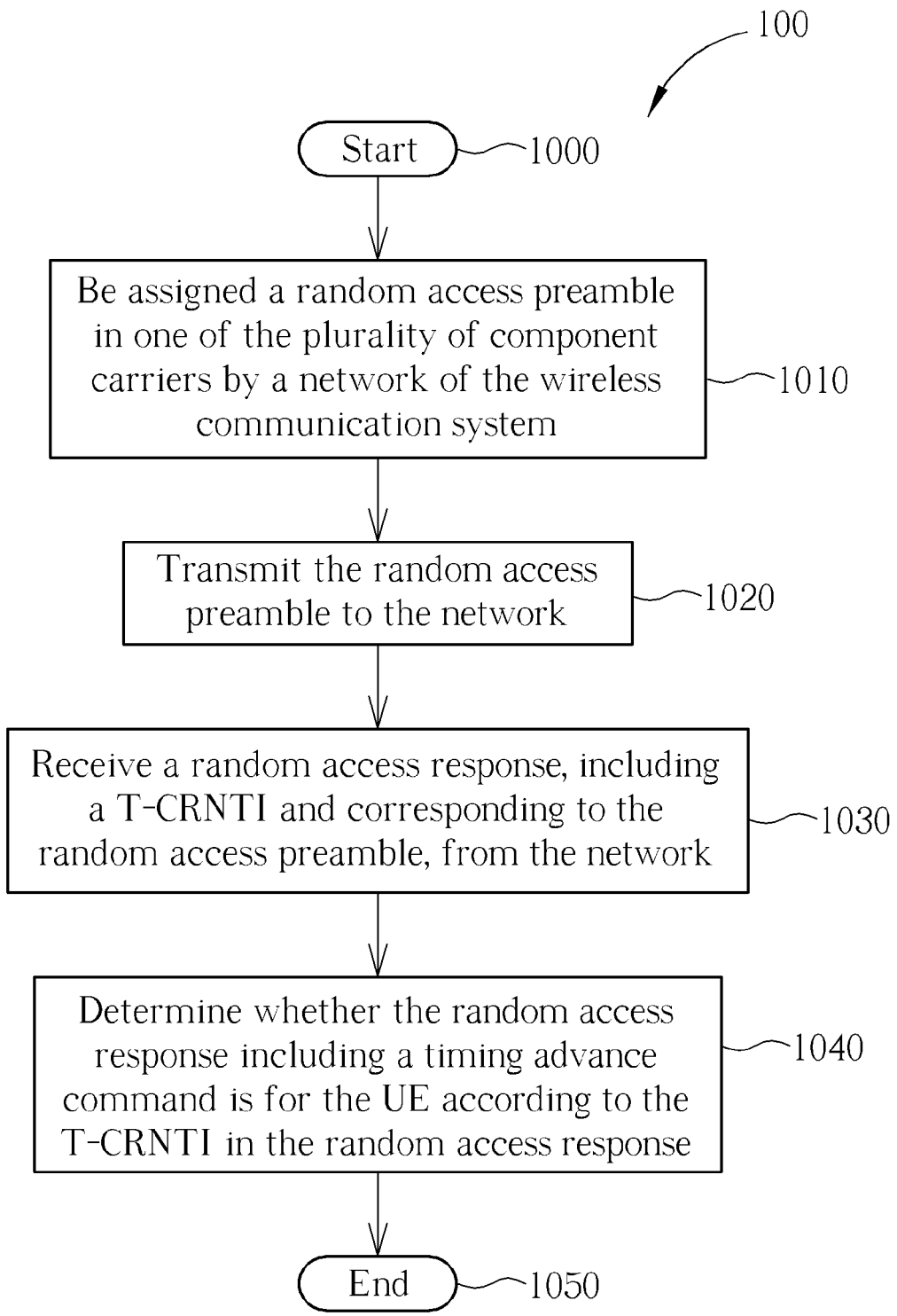

Please refer to FIG. 10, which illustrates a flowchart of an exemplary process 100. The process 100 is utilized in a UE for handling random access response in cross carrier scheduling. The process 100 can be compiled into the program code 214 and includes the following steps:

Step 1000: Start.

Step 1010: Be assigned a random access preamble in one of the plurality of component carriers by a network of the wireless communication system.

Step 1020: Transmit the random access preamble to the network.

Step 1030: Receive a random access response, including a T-CRNTI and corresponding to the random access preamble, from the network.

Step 1040: Determine whether the random access response including a timing advance command is for the UE according to the T-CRNTI in the random access response.

Step 1040: End.

According to the process 100, after receiving the random access response, the UE performing non contention based random access procedure checks the T-CRNTI in the received random access response, to conform whether the received random access response is for itself or not. If the T-CRNTI of the random access response matches to the C-RNTI (Cell Radio Network Temporary Identifier) in the UE, the UE determines that the received random access response is for itself, and then applies the timing advance command of the random access response for uplink synchronization. Otherwise, the UE does not apply the timing advance command of the random access response, and considers that the received random access response is for others.

Figure 11:
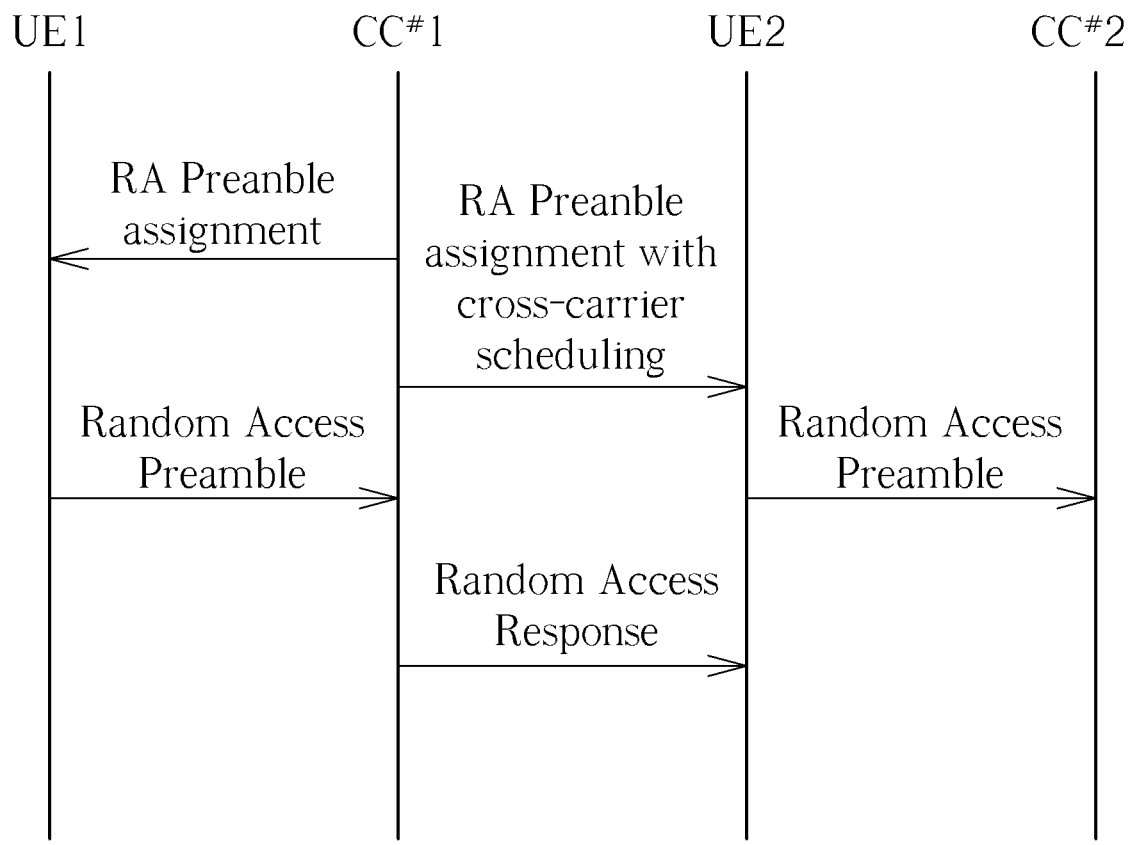
FIG. 11 illustrates a schematic diagram of non contention based random access procedures according to an embodiment of the present invention.

Take an example based on the process 100. Please refer to FIG. 11, which is a schematic diagram of non contention based random access procedures according to an embodiment of the present invention. The network assigns random access preambles respectively for UE1 and UE2 through the component carrier cc#1. In other words, the network assigns the random access preamble to the UE2 with the cross carrier scheduling. The UE1 transmits the random access preamble to the network via the component carrier cc#1, and the UE2 transmits the random access preamble to the network via the component carrier cc#2. As above mentioned, the network may assign identical random access preambles to UE1, UE2 and consequently they may transmit preambles at the same time. In this situation, the network responses to the random access preamble from the UE2 on the component carrier cc#1. After the UE1 and UE2 receives and decodes the random access response on the component carrier cc#1, the UE1 and UE2 respectively check the T-CRNTI in the random access response to know whether the random access response is for itself or not. As can be seen, when a UE performing a non contention based random access procedure receives a random access response, the UE does not apply the timing advance command immediately, but checks the T-CRNTI of the random access response, so as to avoid applying wrong timing advance command.

Take another example as follows. A contention based preamble on the PCell is received by the network, but the non contention based preamble on the SCell not received by the network. The network responses to the contention based preamble with a random access response including T-CRNTI at the PCell since the non contention based preamble is not received. The assigned T-CRNTI shall not be identical with C-RNTI which was used for the UE performing the non-contention based random access procedure. Based on the concept of the process 100, the UE performing the non contention based random access procedure checks the T-CRNTI in the random access response to know whether the random access response is for itself or not after receiving the random access response. In this case, the UE performing the non contention based random access procedure shall find out that the T-CRNTI is not for itself, and thereby determines that the random access response is not for the non contention based random access procedure. Thus, the UE waits another instruction for performing a new non contention based random access procedure. Alternatively, UE performing contention based random access procedure would perform following contention resolution with receiving response.

Figure 12:
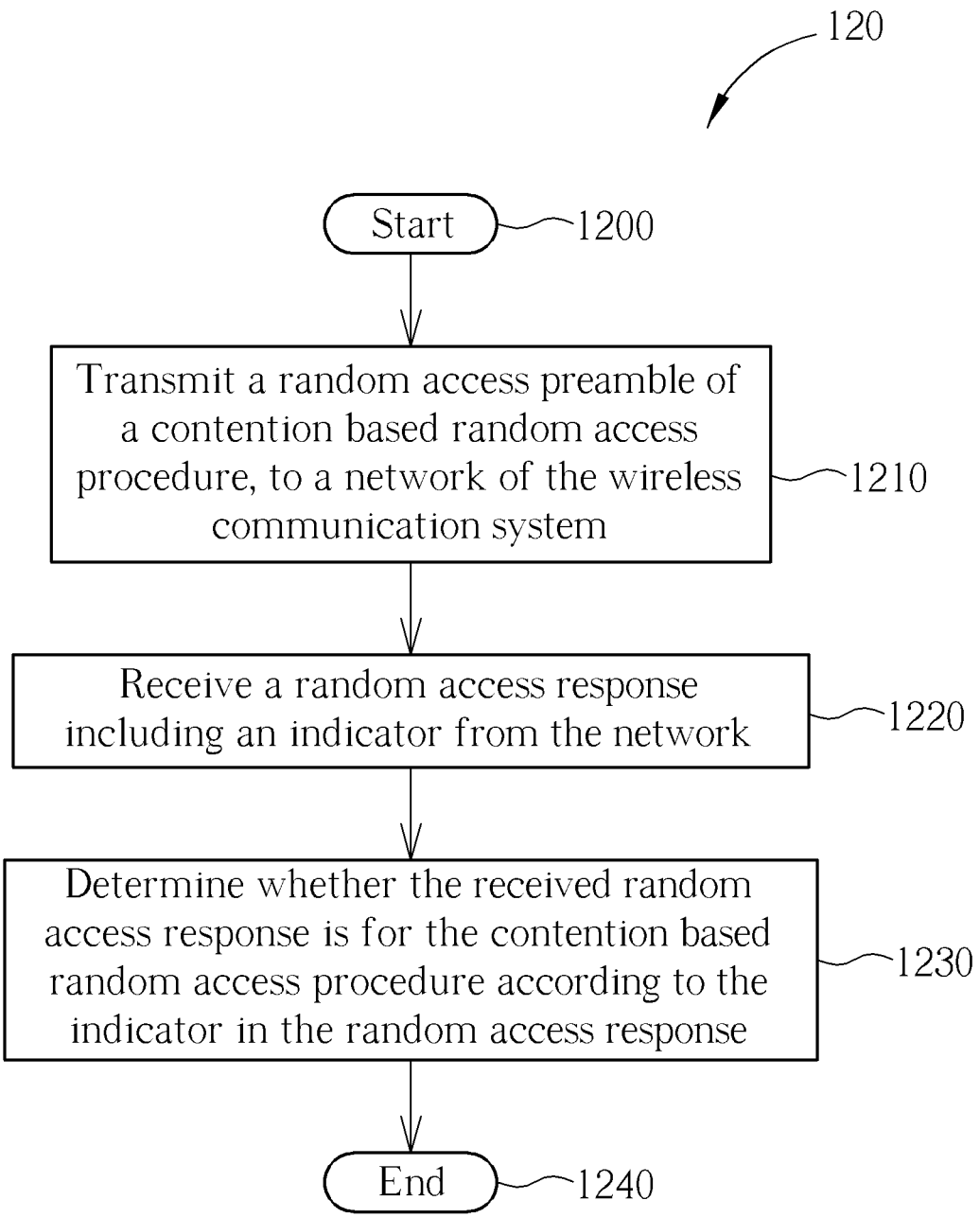
FIG. 12 is a flowchart of an exemplary process.

Please refer to FIG. 12, which illustrates a flowchart of an exemplary process 120. The process 120 is utilized in a UE for handling random access response in cross carrier scheduling. The process 120 can be compiled into the program code 214 and includes the following steps:

Step 1200: Start.

Step 1210: Transmit a random access preamble of a contention based random access procedure, to a network of the wireless communication system.

Step 1220: Receive a random access response including an indicator from the network.

Step 1230: Determine whether the received random access response is for the contention based random access procedure according to the indicator in the random access response.

Step 1240: End.

According to the process 120, an indicator is defined in the random access response for the UE performing contention based random access procedure to determine whether the received random access response is for the contention based random access procedure or not. For example, if the indicator indicates that the random access response is for non contention based random access procedure, the UE determines that the received random access response is for others, and does not apply the timing advance command of the random access response. On the other hand, if the indicator indicates that the random access response is not for non contention based random access procedure, the UE determines that the received random response is for itself, and applies the timing advance command of the random access response. Note that, after determining that the random access response is not for itself, the UE discontinuous the contention resolution operation in the contention based random access procedure, and sends a new random access preamble, so as to avoid interference of message 3 transmission and waste resources.

Take an example based on the concept of the process 120. Please refer to FIGS. 13-14, which illustrate a schematic diagram of a non contention based random access procedure with cross carrier scheduling and a contention based random access procedure according to an embodiment of the present invention. After a random access response RAR is received in the PCell, the UE performing contention based random access procedure checks whether the indicator is set to a predetermined value. The indicator may be expressed by a 1-bit value, and is set by the network. For example, the random access response RAR is for the contention based random access procedure when the indicator represents as "0", whereas the random access response RAR is for the non contention based random access procedure when the indicator represents as "1". Therefore, when the UE receives the random access response RAR, the UE does not apply the timing advance command immediately, but checks the indicator of the random access response firstly. If the indicator is set to "0", the UE apply the timing advance command of the random access response RAR, and continues the contention resolution operation (i.e. message 3 transmission) of the contention based random access procedure. On the other hand, if the indicator is set to "1", the UE does not apply the timing advance command and stops the contention resolution operation of the contention based random access procedure.

Figure 13:
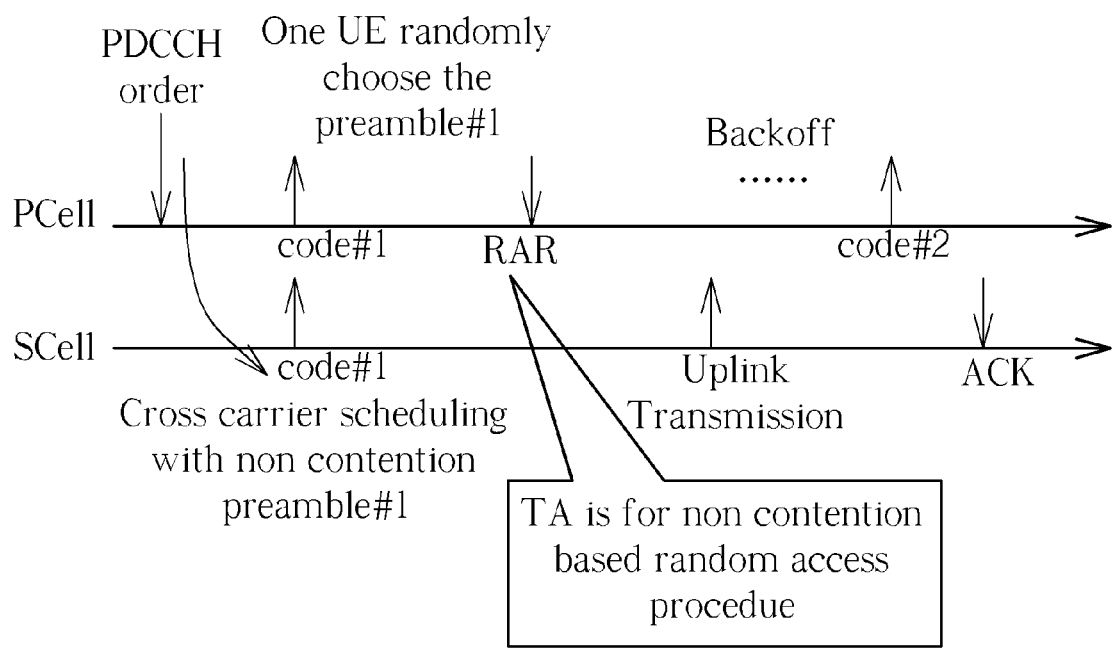
FIGS. 13-14 illustrate a schematic diagram of a non contention based random access procedure with cross carrier scheduling and a contention based random access procedure according to an embodiment of the present invention.
Figure 14:
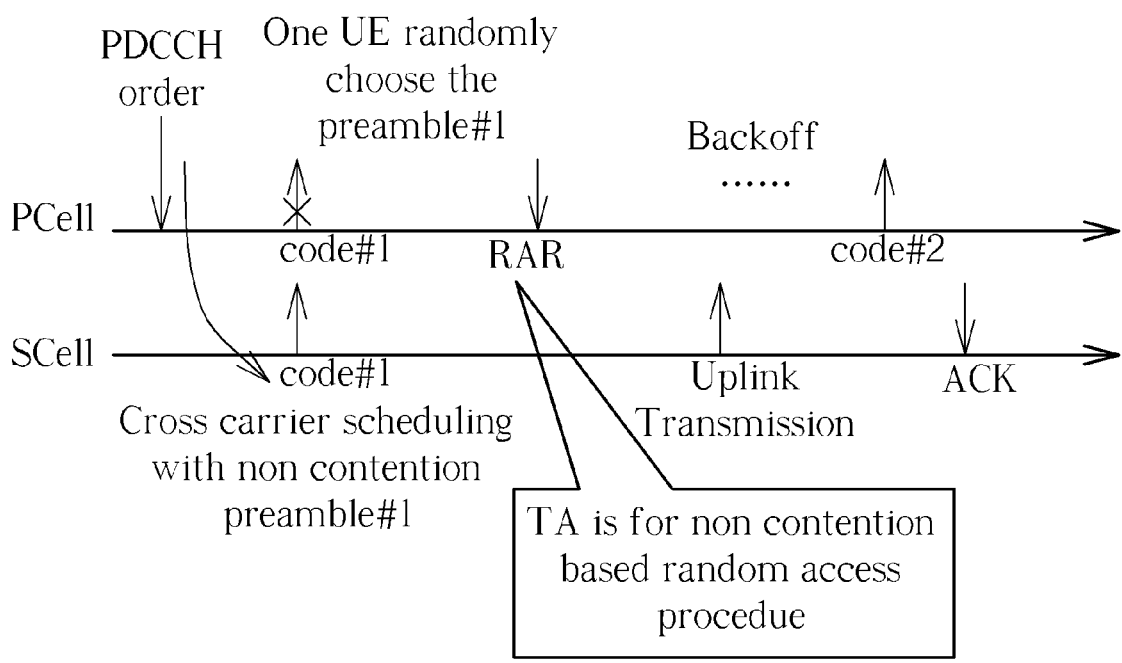

Note that, in FIGS. 13-14, the random access response RAR is for the non contention based random access procedure, and thereby the network sets the indicator to "1". Thus, the UE knows that the random access response RAR is not for itself, and then sends a new random access preamble, so as to avoid resource waste and uplink synchronization operation delay.

Figure 15:
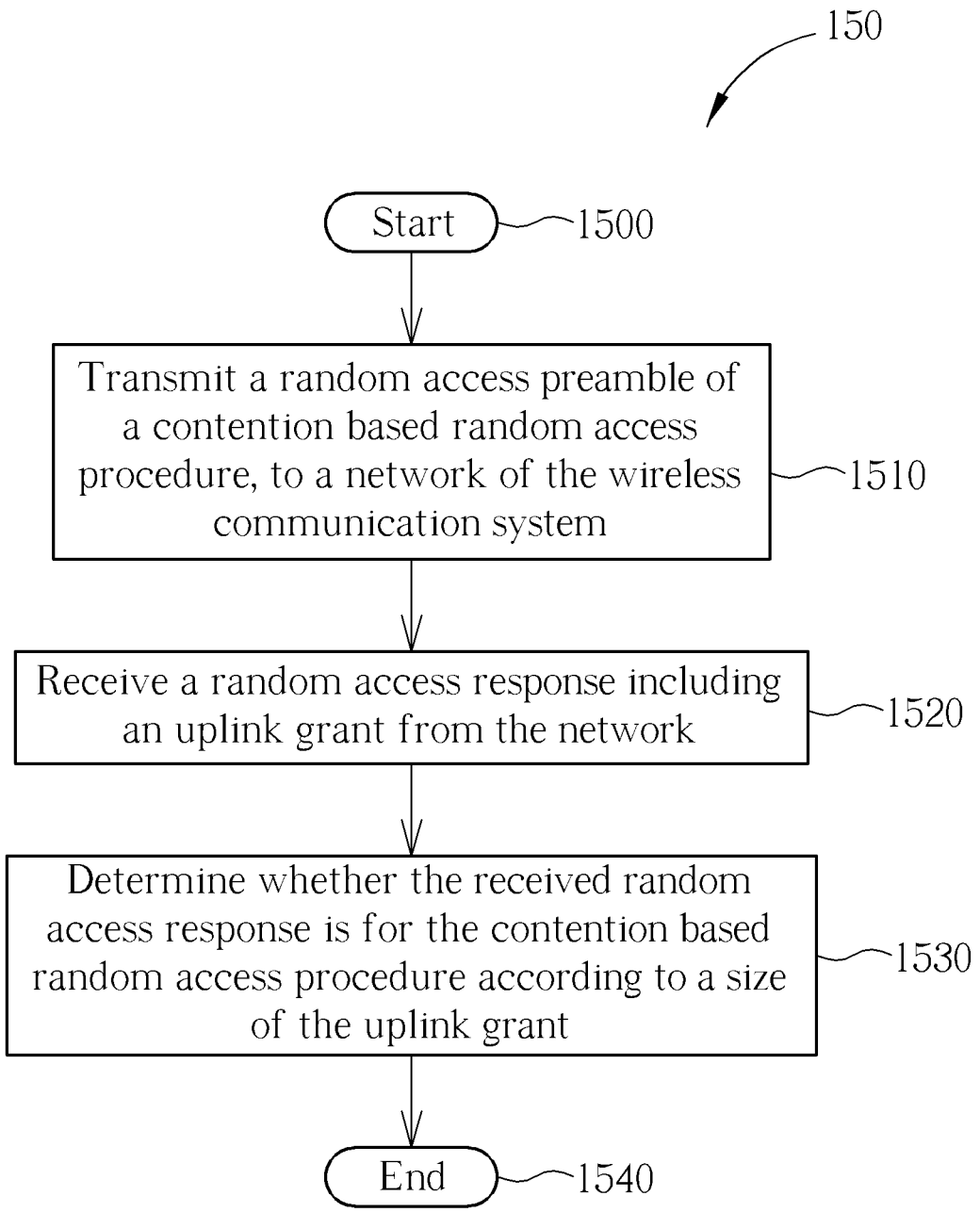
FIGS. 15-16 are flowcharts of exemplary processes.

Please refer to FIG. 15, which illustrates a flowchart of an exemplary process 150. The process 150 is utilized in a UE for handling random access response in cross carrier scheduling. The process 150 can be compiled into the program code 214 and includes the following steps:

Step 1500: Start.

Step 1510: Transmit a random access preamble of a contention based random access procedure, to a network of the wireless communication system.

Step 1520: Receive a random access response including an uplink grant from the network.

Step 1530: Determine whether the received random access response is for the contention based random access procedure according to a size of the uplink grant.

Step 1540: End.

According to the process 150, the UE performing contention based random access procedure determines whether the received random access response is for the contention based random access procedure or not according to the size of the uplink grant in the random access response. For example, if size of the uplink grant is smaller than a threshold, the UE determines that the received random access response is for a non contention based random access procedure, and does not apply timing advance command of the random access response. Otherwise, the UE determines that the received random response is for the contention based random access procedure, and applies the timing advance command of the random access response. Note that, after determining that the random access response is not for itself, the UE discontinuous the contention resolution operation in the contention based random access procedure, and sends a new random access preamble, so as to avoid interference of message 3 transmission and waste resources.

Take an example based on the process 150, and referring back to FIGS. 13-14. In FIGS. 13-14, after the random access response RAR is received in the PCell, the UE performing contention based random access procedure checks whether the size of the uplink grant is smaller than a threshold. The threshold may be determined according to the size of a resource for transmitting the message 3. For example, if the size of the uplink grant in the random access response is smaller than the size of message 3, the UE determines the random access response RAR is not for itself since not enough resource can be used for message 3 transmission, and stops the contention resolution operation of the contention based random access procedure. On the other hand, if the size of the uplink grant in the random access response is greater than the size of message 3, the UE determines the random access response RAR is for itself since enough resource can be used for message 3 transmission, and continues the contention resolution operation of the contention based random access procedure.

Note that, in FIGS. 13-14, the random access response RAR is for the non contention based random access procedure, and thereby the network assigns insufficient UL granted resource in the random access response. Thus, the UE knows that the random access response RAR is not for itself, and then sends a new random access preamble, so as to avoid resource waste and uplink synchronization operation delay.

Figure 16:
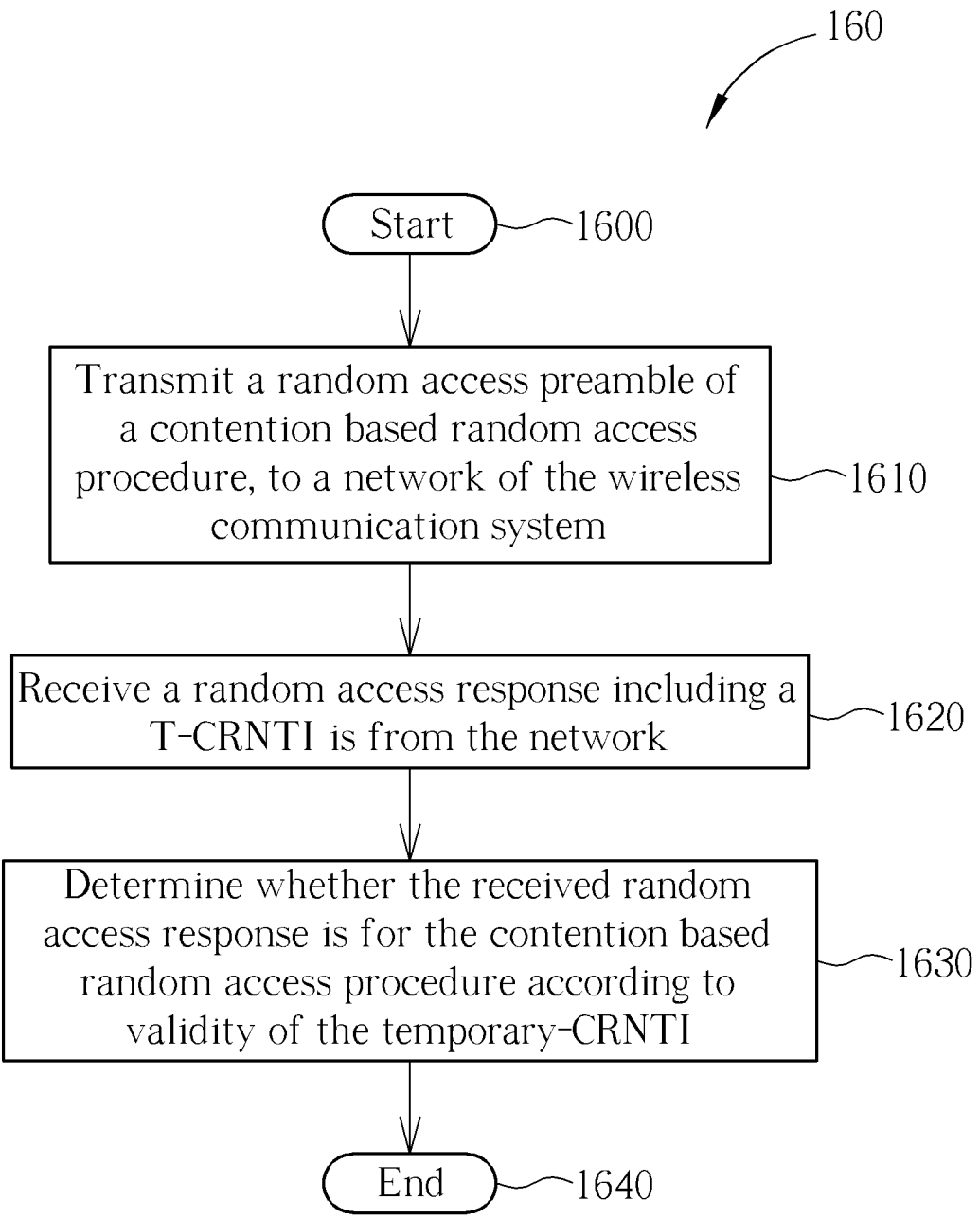

Please refer to FIG. 16, which illustrates a flowchart of an exemplary process 160. The process 160 is utilized in a UE for handling random access response in cross carrier scheduling. The process 160 can be compiled into the program code 214 and includes the following steps:

Step 1600: Start.

Step 1610: Transmit a random access preamble of a contention based random access procedure, to a network of the wireless communication system.

Step 1620: Receive a random access response including a T-CRNTI is from the network.

Step 1630: Determine whether the received random access response is for the contention based random access procedure according to validity of the temporary-CRNTI.

Step 1640: End.

According to the process 160, the UE performing contention based random access procedure determines whether the received random access response is for the contention based random access procedure or not according to the validity of the temporary-CRNTI. For example, if the T-CRNTI is invalid, the UE determines that the received random access response is for non contention based random access procedure, and does not apply timing advance command of the random access response. Otherwise, the UE determines that the received random response is for the contention based random access procedure, and applies the timing advance command of the random access response. Note that, after determining that the random access response is not for the contention based random access procedure, the UE discontinuous the contention resolution operation in the contention based random access procedure, and sends a new random access preamble, so as to avoid interference of message 3 transmission and waste resources.

Take an example based on the process 160, and referring back to FIG. 13-14. In FIGS. 13-14, after the random access response RAR is received in the PCell, the UE performing contention based random access procedure checks the validity of the T-CRNTI in the random access response. For example, if the T-CRNTI is set to "0000" or "FFF4-FFFC" (namely reserved), the UE determines the random access response is not for contention based random access procedure, and stops the contention resolution operation of the contention based random access procedure. On the other hand, if the T-CRNTI is valid, the UE determines the random access response is for the contention based random access procedure, and continues the contention resolution operation of the contention based random access procedure.

Note that, in FIGS. 13-14, the random access response RAR is for the non contention based random access procedure, and thereby the network sets the T-CRNTI to be invalid (i.e. "0000" or "FFF4-FFFC") in the random access response. Thus, the UE knows that the random access response RAR is not for itself, and then sends a new random access preamble, so as to avoid resource waste and uplink synchronization operation delay.

In conclusion, the present invention provides methods and apparatus for handling random access response in cross carrier scheduling, so as to avoid interference and resource waste.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling random access response for a network in a wireless communication system, the method comprising:

receiving a first random access preamble from a first mobile device of the wireless communication system at a first component carrier of a plurality of component carriers;

receiving a second random access preamble from a second mobile device of the wireless communication system at a second component carrier of the plurality of component carriers, wherein the second random access preamble is identical to the first random access preamble and is assigned by the network;

only responding to the assigned second random access preamble with a random access response including a timing advance command associated to the second mobile device, at the first component carrier, wherein after the second mobile device receives the random access response, the second mobile device checks an indicator to see if it is set to a predetermined value, and discontinues a contention resolution of a contention based random access procedure when determining that the indicator is not the predetermined value; and responding no random access response to the first random access preamble selected and transmitted by the first mobile device.

2. The method of claim 1, further comprising:

ignoring the first random access preamble from the first mobile device at the first component carrier.

3. A method of handling random access response for a network in a wireless communication system, the method comprising:

assigning a first random access preamble for a first mobile device in a first component carrier of a plurality of component carriers;

receiving a second random access preamble from a second mobile device at a second component carrier, wherein the second random access preamble is identical to the first random access preamble;

receiving no assigned first random access preamble from the first mobile device at the first component carrier during a period of time; and responding no random access response to the first and second random access preambles;

wherein after the first mobile device or second mobile device receives the random access response, the first mobile device or second mobile device checks an indicator to see if it is set to a predetermined value, and discontinues a contention resolution of a contention based random access procedure when determining that the indicator is not the predetermined value.

4. A method of handling random access response for a mobile device in a wireless communication system, the method comprising:

transmitting a random access preamble of a contention based random access procedure to a network of the wireless communication system;

receiving a random access response, including a temporary cell radio network temporary identifier (T-CRNTI) and corresponding to the random access preamble, from the network; and determining that the random access response is for the mobile device when the T-CRNTI is equivalent to a C-RNTI of the mobile device, and applying the timing advance command included in the random access response for an uplink synchronization; and determining that the random access response is not for the mobile device when the T-CRNTI is not equivalent to a C-RNTI of the mobile device, and not applying the timing advance command included in the random access response for an uplink synchronization.

5. A method of handling random access response for a mobile device in a wireless communication system, the method comprising:
- transmitting a first random access preamble of a contention based random access procedure, to a network of the wireless communication system;
- receiving a random access response including an uplink grant from the network;
- determining whether the received random access response is for the mobile device according to a size of the uplink grant, wherein the determining step comprises determining that the random access response is not for the mobile device when the size of the uplink grant is smaller than a threshold, wherein the threshold is determined according to a size of a message 3 of the contention based random access procedure; and
- discontinuing a contention resolution of the contention based random access procedure when determining that the random access response is not for the contention based random access procedure.

6. The method of claim 5, further comprising:
transmitting a second random access preamble of the contention based random access procedure, to the network of the wireless communication system.

7. A method of handling random access response for a mobile device in a wireless communication system, the method comprising:
- transmitting a first random access preamble of a contention based random access procedure, to a network of the wireless communication system;
- receiving a random access response including a temporary cell radio network temporary identifier (T-CRNTI), from the network;
- determining whether the received random access response is for the mobile device according to validity of the T-CRNTI, wherein the determining step comprises determining that the random access response is not for the mobile device when the T-CRNTI is invalid or set to a predetermined value; and
- discontinuing a contention resolution of the contention based random access procedure when determining that the random access response is not for the mobile device.

8. The method of claim 7, further comprising:
transmitting a second random access preamble of the contention based random access procedure, to the network of the wireless communication system.

* * * * *